May 26, 1936.  D. E. VAN DEUSEN ET AL  2,042,081
INSERTED BLADE TYPE CUTTER
Filed Sept. 13, 1935
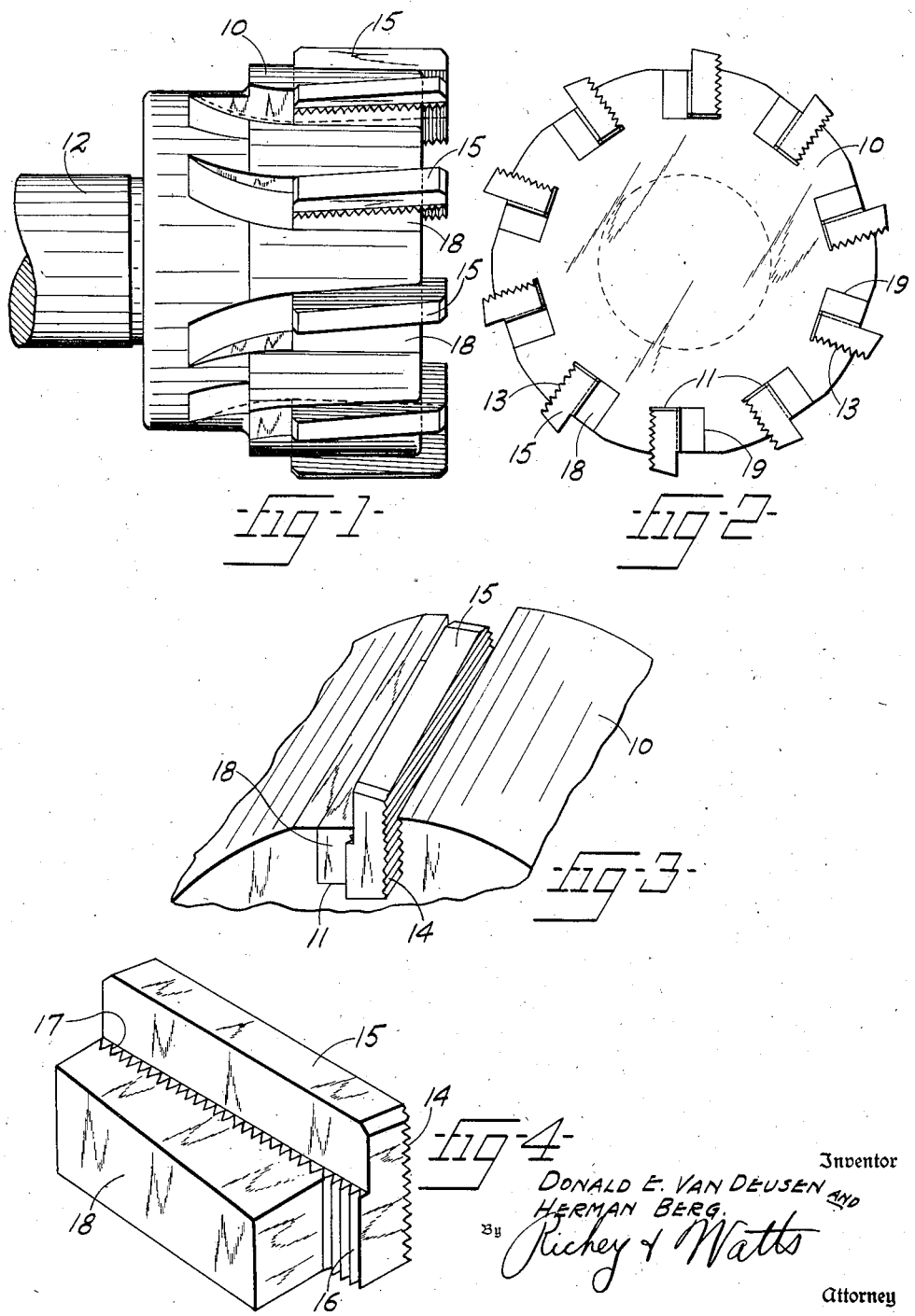

Patented May 26, 1936

2,042,081

UNITED STATES PATENT OFFICE 2,042,081

INSERTED BLADE TYPE CUTTER

Donald E. Van Deusen and Herman Berg, Cleveland, Ohio, assignors to The Kelly Reamer Company, Cleveland, Ohio, a corporation of Ohio Application September 13, 1935, Serial No. 40,452

4 Claims. (Cl. 29—105)

This invention relates broadly to metal cutting tools of the insertable blade type and more specifically to improvements in the blade locking mechanism therefor.

One of the objects of the invention is the provision of a blade supporting structure which will accommodate longitudinal and radial adjustments and assure the rigid securement of the blade within the holder through a unitary locking member.

Another object of the invention is the construction of a blade which is adapted to facilitate combined axial and radial adjustment without removal of the blade from its holder.

Another object of the invention is the provision of a blade locking device which is adapted to facilitate independent adjustment of the blade either axially or radially so that the circumferential cutting edge or end facing edge of the blade may be dressed or reground without unnecessary removal of stock.

Another object of the invention is the provision of a locking mechanism which is adapted to restrain radial and axial thrusts upon the blade and to accommodate re-setting of the blades within definite limits of adjustment so that the cutters may be readily repositioned for grinding.

Other objects of our invention will appear from the following description of preferred embodiments of my invention, reference being made to the drawing; the essential characteristics of the invention being summarized in the claims.

In the drawing wherein the preferred embodiment of the invention is illustrated:

Fig. 1 is a side elevational view of a tool holder embodying the present invention;

Fig. 2 is an end elevational view of the tool holder and cutters illustrated in Fig. 1;

Fig. 3 is a fragmentary enlarged detailed view of a fragmentary portion of the holder and one of the cutter blades; and Fig. 4 is an enlarged detailed view of the cutter tool and wedge therefor, the cutter and wedge being associated in assembled relation.

As illustrated in Fig. 1, the tool head or cutting bit holder comprises a cylindrical body 10 having longitudinal grooves 11 disposed in the periphery thereof. In the present embodiment the slots 11 are disposed slightly divergent both axially and radially to the medial axis of the tool head, a wall of each of the grooves being tapered from the forward end inwardly for cooperative engagement with a tapered lock wedge. The tool head illustrated is provided with a shank 12 for retention within a suitable sleeve or tool holder. It will be understood, however, that various other types of blade holding supports such as a boring bar reamer or facing tool head may be substituted for the holder shown, and that such blade supporting medii is deemed to be within the scope and spirit of the present invention.

A vertical wall in each of the slots 11 is formed with longitudinal serrations or grooves and ledges 13 pariaxial the bottom wall thereof and slightly divergent the axis of the tool. These serrations are adapted for engagement with complemental grooves and ledges 14 formed in a side wall of the cutter blades 15. The opposed side wall of the cutter blade 15 is formed with serrations 16 disposed in vertical relation to the major axis of the cutter blade. The latter serrations are adapted for engagement with complemental serrations 17 machined in the inner face of a wedge block 18 (see Fig. 4). The opposed face of the wedge 18 is suitably tapered for frictional engagement with the smooth surface of the wall 19 in the slots 11. Thus the longitudinal serrations in the blade and holder and the vertical serrations in the cutter wedge will be held in interlocked relation when the wedge is driven to its seated position.

In operation when it is desired to grind or redress the blades, the wedges 18 and blades 15 are first removed then the blades may be adjusted radially by setting the blade so that the vertical serrations 16 therein are positioned one tooth or groove in advance or outwardly in relation to the wedge serrations from which the blade was removed, the axially divergent serrations 13 and 14 in the blade and head respectively causing a micrometric radially enlarged adjustment of the blade as the wedge and cutter blade are reseated. In the event the blade is nicked or otherwise injured so that it is necessary to remove a greater amount of stock the blade may be set into the next axial groove above or radially outward that from which the cutter was removed. Should it be desired to grind the end face of the blades 15 an amount proportionately excessive to that of the longitudinal edge, the blades 18 may be advanced in relation with the wedge so that the serrations 16 in the blade are interengaged with the next rearwardly disposed serration 17 in the wedge. After the initial seated adjustment of the wedges within their tapered slots they may be axially reseated in substantially the same position in which they were formerly disposed. Thus by advancing the cutter blade 15 a single step in the wedge serrations 17, the cutter may be accurately repositioned for cutting a larger hole or for redressing the blade. Illustrative of a practical example of the coordinated proportions of the wedge and blade, assume the longitudinal serrations of the blade to be inclined 5° from the face of the tool inwardly also that the width of the vertical serrations in the blade are .045 of an inch at the root thereof. Now as the blade is adjusted one serration forward on the wedge the blades will be raised .004 of an inch thus increasing the diameter of the cutter .008 of an inch. Obviously the end cutting face of the blades will likewise be proportionately extended, that is .045 of an inch, and may be used as so adjusted or reground.

Although the foregoing description is necessarily of a detailed character, in order that the invention may be completely set forth, it is to be understood that the specific terminology is not intended to be restrictive or confining and that various rearrangements of parts and modifications of structural detail may be resorted to without departing from the scope or spirit of the invention as herein claimed.

We claim:

1. A rotary cutter of the insertable blade type comprising a body having longitudinal grooves in the periphery thereof, longitudinal serrations in one of the vertical walls of said grooves convergent the axis of rotation of said cutter, a cutter blade, longitudinal serrations in a wall thereof engaged with the serrations in the wall of the groove of said body, radial serrations in the opposed wall of said blade, a wedge, radial serrations in one face thereof engaged with the radial serrations in said blade, the opposed face of said wedge being smooth and frictionally engaged with the other vertical wall of the groove in said body, said wedge being tapered transverse the serrations therein, whereby said cutter and said wedge may be removed as a unit endwise from said body and an operative cutting adjustment of the cutter effected by advancing the radial serrations in the wedge relative the radial serrations in the blade without changing the interengaged relation between the longitudinal serrations in said blade and groove in said body.

2. A rotary cutter of the insertable blade type comprising a body having longitudinal grooves in the periphery thereof, one of the vertical walls being laterally divergent the other, serrations in one of the walls convergent with the axis of rotation of said body, a blade, serrations in one face thereof inclined and engaged with the said serrations in the wall of the groove, radial serrations in the opposed face of said blade, a wedge, radial serrations in a face thereof engaged with said radial serrations in the blade, the opposed face of said wedge being smooth and frictionally engaged with the divergent wall of said groove, whereby said wedge and said blade may be removed together through the end of said groove, the relation of the radial serrations in said blade and wedge adjusted, the blade repositioned in the same longitudinal serrations formerly occupied thereby and radial adjustment of the blade effected by tightening said wedge.

3. A rotary cutter of the insertable blade type comprising a body having longitudinal tapered grooves in the periphery thereof, serrations in one of the side walls of said groove converging with the axis of rotation of said body, a blade, serrations in one face thereof and engaged with the serrations in the wall of said groove, radial serrations in the opposed face of said blade, a wedge, radial serrations in a face thereof engaged with the radial serrations in the blade, the opposed face of said wedge being smooth and longitudinally engaged with the other side wall of said tapered groove, whereby said wedge and said blade may be simultaneously retracted from said groove.

4. A rotary cutter of the insertable blade type comprising a body having longitudinal tapered grooves in the periphery thereof, serrations in one of the side walls of said groove inclined to the axis of rotation of said body, a blade, serrations in one face thereof and engaged with the serrations in the wall of said groove, radial serrations in the opposed face of said blade, a wedge, radial serrations in a face thereof engaged with the radial serrations in the blade, the opposed face of said wedge being smooth and longitudinally engaged with the other side wall of said tapered groove, the inclination of the longitudinal serrations being coordinated with the spacing of each of the radial serrations to effect a radial adjustment of the blade of less magnitude than obtained by the adjustment in each longitudinal serration.

DONALD E. VAN DEUSEN.
HERMAN BERG.